(12) United States Patent
Barhahn et al.

(10) Patent No.: US 11,286,973 B1
(45) Date of Patent: Mar. 29, 2022

(54) SYSTEMS AND METHODS FOR CARABINER GATE AUTOMATIC LOCKING

(71) Applicants: Brent Barhahn, Salt Lake City, UT (US); John Baker, Salt Lake City, UT (US); Peter Thomas Gompert, Huntsville, UT (US); Alexander John Szela, Salt Lake City, UT (US); Matthew Ronald Weiseth, Salt Lake City, UT (US)

(72) Inventors: Brent Barhahn, Salt Lake City, UT (US); John Baker, Salt Lake City, UT (US); Peter Thomas Gompert, Huntsville, UT (US); Alexander John Szela, Salt Lake City, UT (US); Matthew Ronald Weiseth, Salt Lake City, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 0 days.

(21) Appl. No.: 17/130,240

(22) Filed: Dec. 22, 2020

(51) Int. Cl.
*F16B 45/02* (2006.01)
*F16B 45/04* (2006.01)

(52) U.S. Cl.
CPC ............. *F16B 45/02* (2013.01); *F16B 45/04* (2013.01)

(58) Field of Classification Search
CPC ................................. F16B 45/02; F16B 45/04
See application file for complete search history.

(56) References Cited

U.S. PATENT DOCUMENTS

| 8,276,247 | B2 * | 10/2012 | Yang | F16B 45/02 24/599.9 |
|---|---|---|---|---|
| 9,003,617 | B2 | 4/2015 | Belcourt et al. | |
| 9,039,055 | B1 | 5/2015 | Robins | |
| 9,212,688 | B2 | 12/2015 | Jang et al. | |
| 9,255,602 | B2 | 2/2016 | Liang | |
| 9,267,535 | B2 | 2/2016 | Jang et al. | |
| 9,273,717 | B2 | 3/2016 | Schlangen et al. | |
| 9,322,428 | B2 | 4/2016 | Perner | |
| 9,328,765 | B2 | 5/2016 | Perner | |
| 9,382,939 | B1 | 7/2016 | Rullo et al. | |
| 9,441,665 | B2 | 9/2016 | Liang et al. | |
| 9,470,258 | B2 | 10/2016 | Fitz-Earle et al. | |
| 9,500,221 | B2 | 11/2016 | Yang | |
| 9,630,809 | B2 | 4/2017 | Hoover | |
| 9,878,884 | B1 * | 1/2018 | Ellis | A63B 29/02 |

(Continued)

*Primary Examiner* — David M Upchurch
(74) *Attorney, Agent, or Firm* — Trent Baker; Baker IP PLLC (57) ABSTRACT

An automatic carabiner gate locking system and method of operation. The system includes a frame, a gate, a gate biasing system, and a gate locking system. The gate locking system further includes a set of rotatable latching sleeves disposed over the gate. When the gate is in the closed state, the latching sleeves independently rotate between an unlocked state in which the gate is free to pivot and a locked state in which the gate may be prevented from pivoting with respect to the frame. The locked state further includes rotationally orienting the latching sleeves over the gate frame coupling region. The unlocked state further includes rotationally separating the latching sleeves to expose a locking recess over the gate recess, thereby allowing the gate to pivot. A second embodiment of the present invention relates to a method of automatically locking a carabiner gate.

20 Claims, 6 Drawing Sheets

(56) References Cited

U.S. PATENT DOCUMENTS

| | | | |
|---|---|---|---|
| 9,958,001 B2 | 5/2018 | Rong | |
| 9,958,002 B2 | 5/2018 | Chang | |
| 10,066,660 B2 | 9/2018 | Henn et al. | |
| 10,138,923 B2 | 11/2018 | Vaccari | |
| 10,253,802 B2 | 4/2019 | Codega et al. | |
| D882,378 S * | 4/2020 | Graykowski | D8/356 |
| D902,009 S * | 11/2020 | Yang | D8/336 |
| 2006/0137151 A1* | 6/2006 | Thompson | F16B 45/02 24/598.2 |
| 2014/0082901 A1* | 3/2014 | Yeh | F16B 45/02 24/599.1 |
| 2014/0245576 A1* | 9/2014 | Perner | F16B 45/02 24/600.1 |
| 2014/0361564 A1* | 12/2014 | Huang | F16B 45/02 294/82.11 |
| 2016/0061251 A1* | 3/2016 | Rogelja | A63B 29/02 24/598.3 |
| 2017/0073196 A1 | 3/2017 | Choudhari et al. | |
| 2017/0307004 A1* | 10/2017 | Cardella | F16B 45/02 |
| 2018/0320729 A1 | 11/2018 | Gompert | |

\* cited by examiner

SYSTEMS AND METHODS FOR CARABINER GATE AUTOMATIC LOCKING

FIELD OF THE INVENTION

The invention generally relates to locking carabiners. In particular, the present invention relates to systems and methods of automatic carabiner gate locking.

BACKGROUND OF THE INVENTION

Carabiners, snap-hooks, and releasable clamps are used in a variety of applications for releasably coupling objects to one another. For example, a rock climber may use one or more carabiners to releasably secure a rope to a protection device during vertical ascension. Carabiners generally include a frame, a gate, and a releasable gate closure mechanism. The gate is configured to releasably engage the frame, so as to form a continuous inner region which can be used to mechanically couple to one or more objects. The releasable gate closure mechanism is configured to allow the gate to be selectively pivoted with respect to the frame to facilitate adding or removing items from the continuous inner region. The releasable gate closure mechanism simultaneously biases the gate toward a closed configuration with respect to the frame, so as to maintain mechanical coupling of items within the continuous inner region. A wide variety of frame, gate, and biasing systems exist to specifically accommodate particular applications and/or manufacturing costs for the carabiner.

Various specialized carabiners are designed for particular applications. One type of specialized carabiner includes a locking gate mechanism having a locked state and an unlocked state commonly referred to as a locking carabiner. Locking carabiners may be used to lock the gate in a closed configuration with respect to the frame. A locked carabiner gate reduces and/or avoids unintended gate opening. For example, unintended carabiner gate openings may occur as a result of certain forces acting upon a carabiner, including but not limited to cross-loading gate forces, vibration forces, and other unforeseen acute events such as lateral obstruction forces in a falling scenario. A locking carabiner generally includes any type of carabiner frame with a locking gate mechanism. A particular type of locking carabiner is an autolocking carabiner, meaning that the locking mechanism includes biasing toward the locked state. Automatically locking the locking mechanism means that when a user selectively opens the carabiner gate and subsequently releases the gate, the gate automatically returns to both the closed configuration and the locked state. Another type of carabiner includes a key-lock or notchless locking carabiner. A key-lock carabiner includes a notchless or hookless coupling between the gate and the frame in the closed position. This type of coupling is preferable because it avoids unintended snagging or catching of the carabiner frame in an open gate configuration. Therefore, a key-lock automatic locking carabiner is particularly desirable because it eliminates unintended gate opening via the locking mechanism, automatically relocks the locking mechanism after opening, and eliminates unintended gate frame snagging via the key-lock/geometrical coupling between the frame and the gate.

Various problems exist with conventional automatic locking key-lock carabiners (autolocking carabiners). One common problem is that carabiner locking mechanisms are often overly cumbersome to operate. A gate locking mechanism must be both reliable yet efficient to operate. For example, the most common type of carabiner gate locking mechanism includes a lengthwise threaded screw lock mechanism. When the gate is in a closed configuration with respect to the frame, a user may selectively screw a sleeve over the nose of the carabiner frame, thereby locking the gate in the closed configuration. An automatic version of the screw type locking mechanism includes a biasing system such as a torsion spring, which automatically re-screws the locking mechanism back into the locked position after selective opening. Unfortunately, screw type locking mechanisms (both automatic and manual) are cumbersome to operate and may accidently become unlocked in response to certain forces. Screw type and other automatic carabiner locking mechanisms require complex multi-step high-dexterity operation, are vulnerable to obstruction/failure, or fail to reliably prevent unintended unlocking scenarios.

Therefore, there is a need in the industry for a locking carabiner system that minimizes unintended opening scenarios, provides efficient and intuitive operation, and overcomes the limitations of existing systems in a cost-efficient manner.

SUMMARY OF THE INVENTION

The present invention relates to locking carabiners. One embodiment of the present invention relates to an automatic carabiner gate locking system and method of operation. The system includes a frame, a gate, a gate biasing system, and a gate locking system. The gate locking system further includes a set of rotatable latching sleeves disposed over the gate. When the gate is in the closed state, the latching sleeves independently rotate between an unlocked state in which the gate is free to pivot and a locked state in which the gate may be prevented from pivoting with respect to the frame. The locked state further includes rotationally orienting the latching sleeves over the gate frame coupling region. The unlocked state further includes rotationally separating the latching sleeves to expose a locking recess over the gate recess, thereby allowing the gate to pivot. A second embodiment of the present invention relates to a method of automatically locking a carabiner gate, including automatically engaging a locking system and selectively disengaging the locking system to allow the gate to pivot.

Embodiments of the present invention represent a significant advancement in the field of automatic carabiner gate locking systems. Conventional automatic gate locking systems incorporate a single rotating sleeve biased toward a locked state, requiring a user to selectively twist and/or slide the locking mechanism to disengage the lock. In contrast, embodiments of the present invention provide an intuitive dual-rotation disengagement of the locking system. A user may reliably disengage the locking mechanism with two fingers, without requiring repositioning of the hand with respect to the carabiner and gate, when performing multi-step unlocking sequences. Likewise, the automatic relocking of the system in the open state is both reliable and efficient.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to locking carabiners. One embodiment of the present invention relates to an automatic carabiner gate locking system and method of operation. The system includes a frame, a gate, a gate biasing system, and a gate locking system. The gate locking system further includes a set of rotatable latching sleeves disposed over the gate. When the gate is in the closed state, the latching sleeves independently rotate between an unlocked state in which the gate is free to pivot and a locked state in which the gate may be prevented from pivoting with respect to the frame. The locked state further includes rotationally orienting the latching sleeves over the gate frame coupling region. The unlocked state further includes rotationally separating the latching sleeves to expose a locking recess over the gate recess, thereby allowing the gate to pivot. A second embodiment of the present invention relates to a method of automatically locking a carabiner gate, including automatically engaging a locking system and selectively disengaging the locking system to allow the gate to pivot. Also, while embodiments are described in reference to an automatic locking carabiner system, it will be appreciated that the teachings of the present invention are applicable to other areas including but not limited to non-automatic locking carabiner gate systems.

Figure 1A:
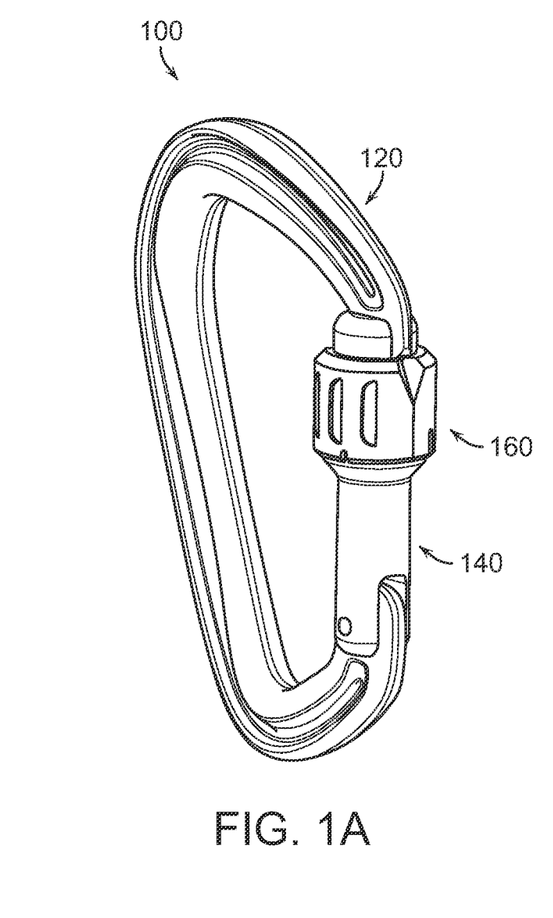
FIGS. 1A-C illustrate a perspective views of an automatic locking carabiner system in a closed locked state, a closed unlocked state, and an open state in accordance with embodiments of the present invention.
Figure 1B:
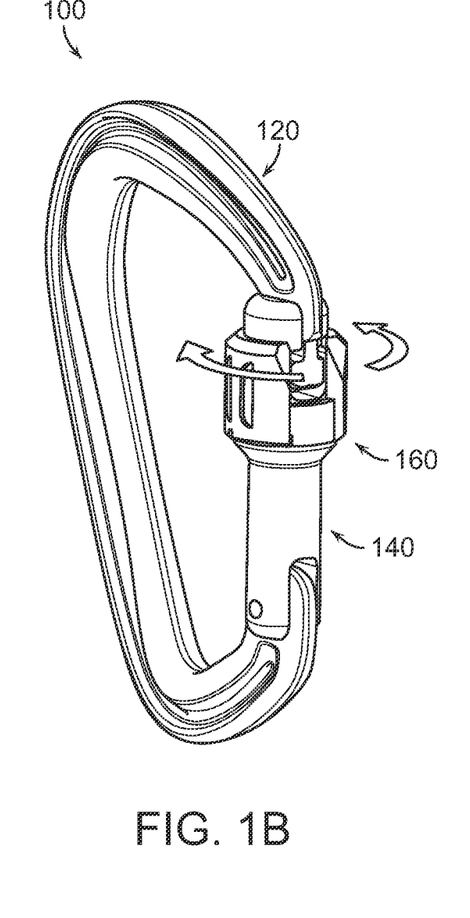
Figure 1C:
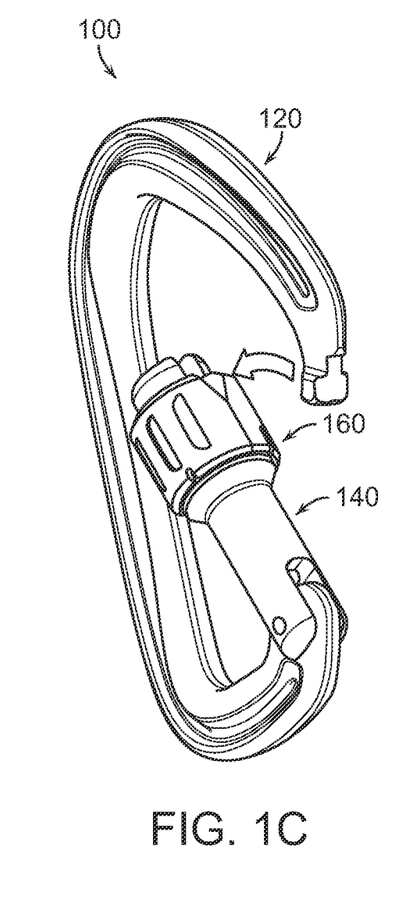
Figure 3A:
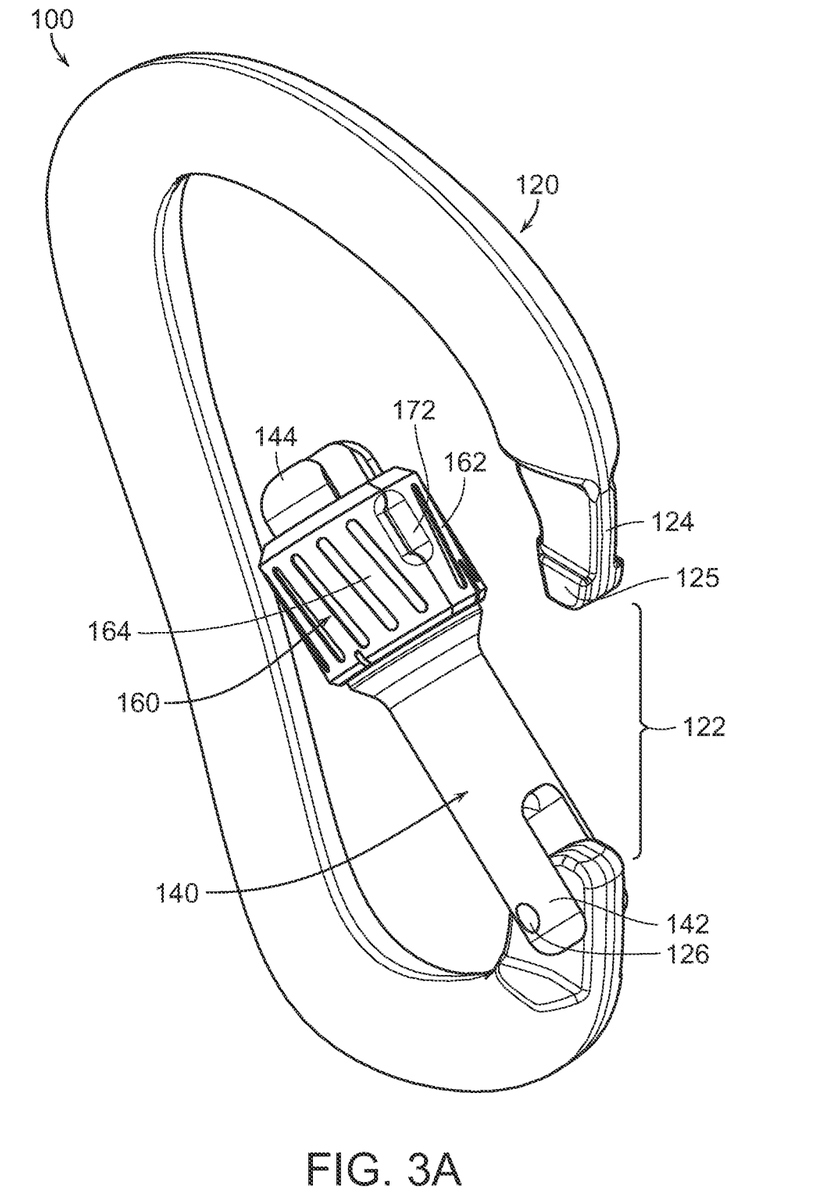
FIGS. 3A-B illustrate a perspective and detailed view of the embodiment illustrated in FIG. 1C in the open state in accordance with embodiments of the present invention.

Reference is initially made to FIGS. 1A-C, which illustrate three different states of one embodiment of an automatic locking carabiner system, designated generally at 100. FIG. 1A illustrates the system 100 in a closed locked state, while FIG. 1B is in a closed unlocked state and FIG. 1C is in an open state. The system 100 includes a frame 120, a gate 140, and a gate locking system 160. The frame 140 is a substantially C-shaped member having an opening 122 (FIG. 3A), a gate frame coupling region 124 (FIG. 3A), and a gate pivot location 126 (FIG. 3A). Although the illustrated embodiment includes a D-shaped frame 120, it will be appreciated that embodiments of the present invention may include an alternative frame style, including but not limited to oval, circular, and triangular shaped frames of various sizes. The frame 120 may comprise a substantially rigid material including but not limited to aluminum, plastic, and/or steel. The frame 120 is preferably composed of a single continuous member. The opening 122 extends between the gate frame coupling region 124 and the gate pivot location 126. The size of the opening 122 corresponds to the length of the gate 140. The illustrated gate frame coupling region 124 includes a geometrical male region corresponding to the gate recess 146 which will be described in more detail below. The gate frame coupling region 124 may also be referred to as a key-lock, notchless, or hookless coupling region. It is preferable to avoid the use of a hook or notch so as to avoid snagging the gate frame coupling region 124 when the gate is in the open state (FIGS. 1C and 3A). The specific shape of the illustrated gate frame coupling region 124 is an inverted T-shape with at least one ramped surface 125 (FIG. 3A). The ramped surface 125 corresponds to a notch 172 on the locking system 160 and will be described in more detail below. The inverted T-shape corresponds to the gate recess 146 to facilitate the male-female releasable coupling of the frame 120 and gate 140 in the closed state (FIGS. 1A, 1B, 2A).

The gate 140 extends across the opening 122 of the frame 120 in the closed state (FIGS. 1A, 1B). The gate 140 is an elongated member having a first end 142 pivotably coupled to the frame 120 at the gate pivot location 126. The gate 140 further includes a second end 144 which is releasably coupled to the frame 120 at the gate frame coupling region 124 in the closed state. The closed state of the gate 140 forms an enclosed region 102 (FIG. 2A) within the frame 120 and gate 140. The closed state further includes a releasable geometric coupling between the second end of the gate 144 and the gate frame coupling region 124 of the frame. The gate 140 further includes an internal gate biasing spring which biases the gate 140 toward the closed state. The second end of the gate 144 includes a gate recess 146 geometrically corresponding to the gate frame coupling region 124. In the closed state, the male shape of the gate frame coupling region 124 is substantially disposed within the female shape of the gate recess 146. The female shape of the gate recess 146 may include a taper or closed portion so as to prevent the gate 140 from pivoting away from the frame 120. FIG. 1C illustrates an internal force arrow representing that in operation a user may apply the internal force upon the gate 140 to overcome the gate biasing spring and transition the gate 140 from the closed state (FIGS. 1A, 1B, 2A) to the open state (FIG. 1C, 3A).

Figure 2A:
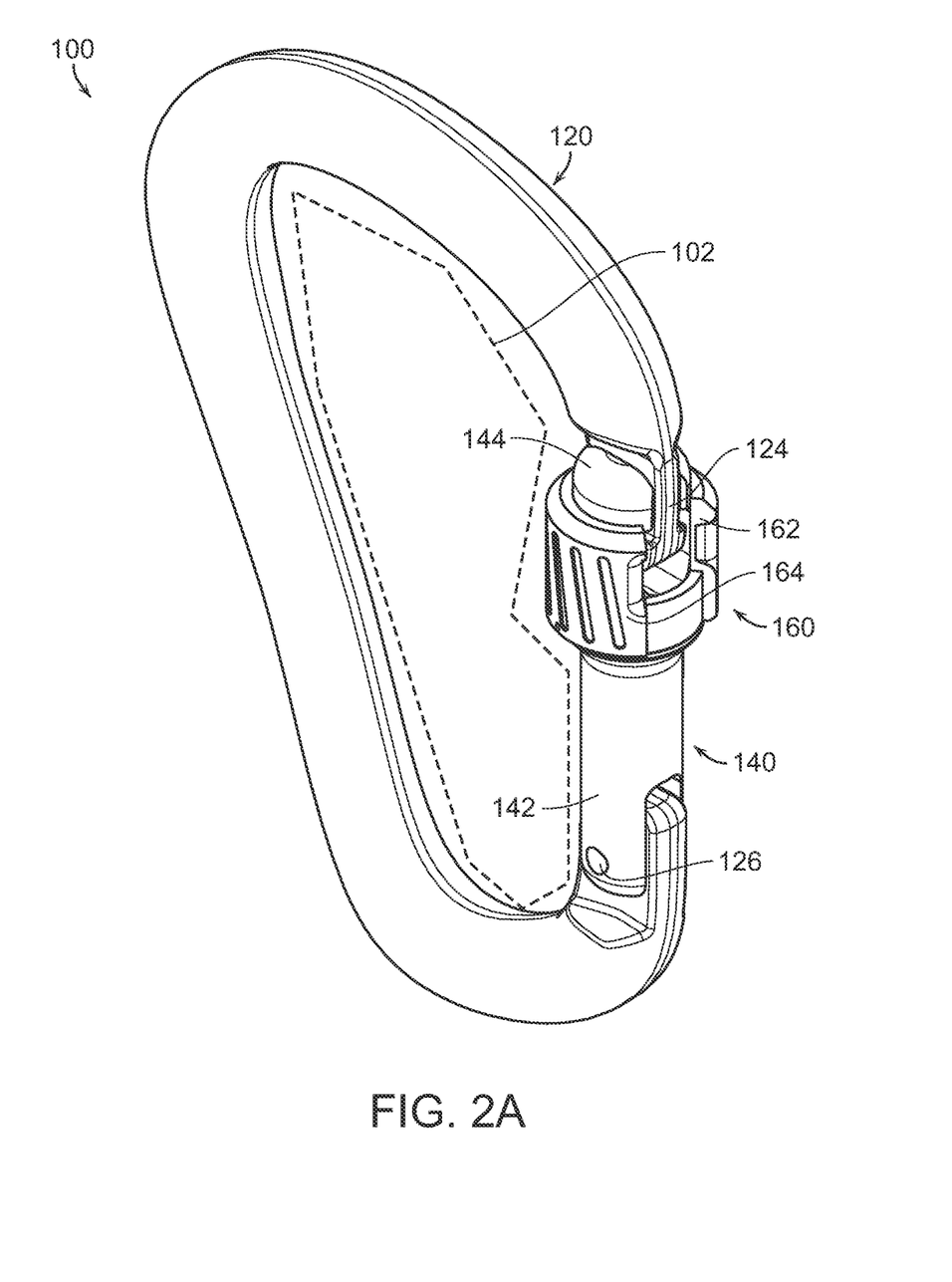
FIGS. 2A-B illustrate a perspective and detailed view of the embodiment illustrated in FIG. 1B in the closed unlocked state in accordance with embodiments of the present invention.
Figure 2B:
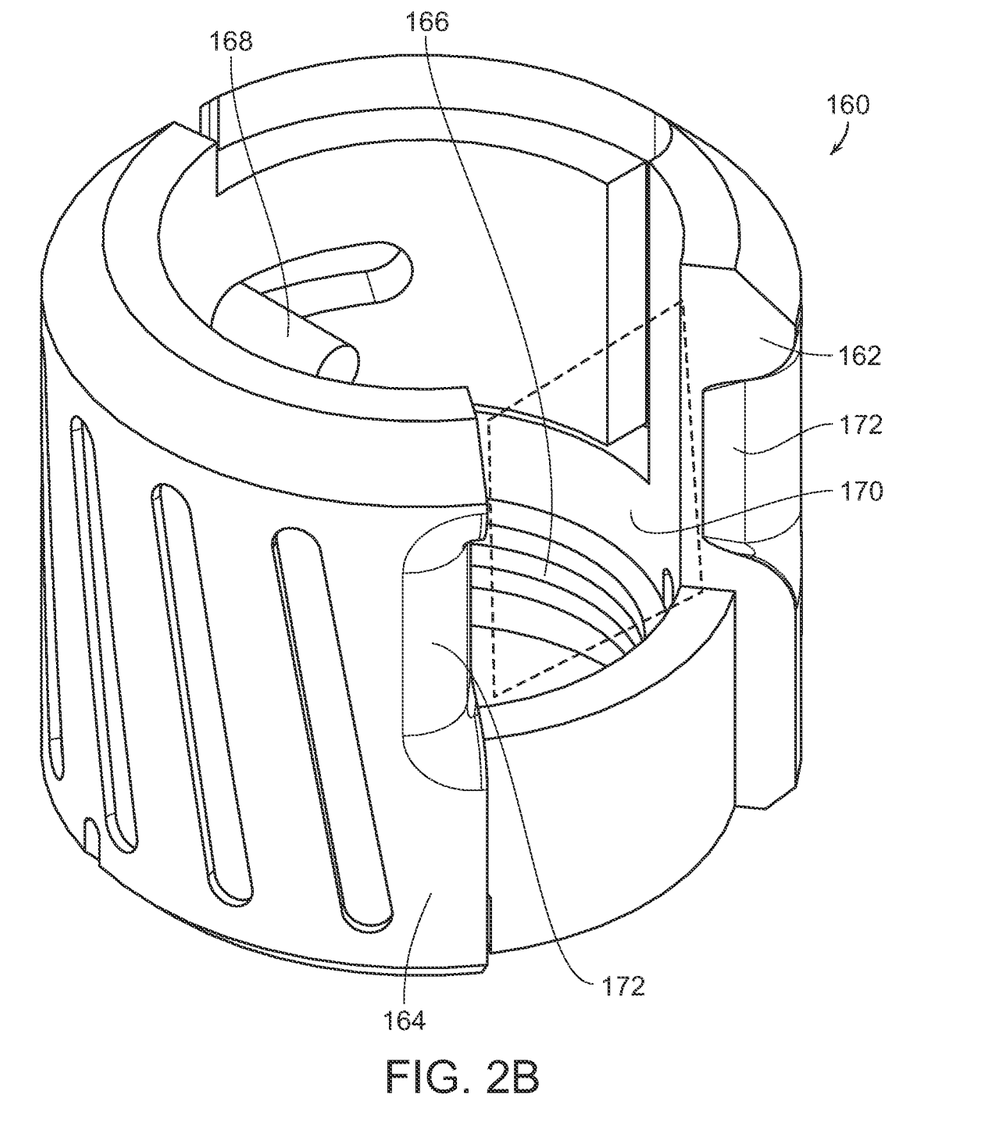

The novel locking system 160 is disposed on the gate 140 in substantial proximity to the second end 144 as illustrated. The locking system 160 is configured to automatically lock the gate 140 in the closed state, herein referred to as the locked state of the locking system 160. The locking system 160 includes a set of latching sleeves 162, 164, a lock biasing spring 166, at least one pin 168, a recess 170, and a notch 172. The individual components of the locking system 162 are illustrated in all figures including individually in the exploded view of FIG. 4. The illustrated latching sleeves 162, 164 are substantially cylindrical members intercoupled in an internested rotatable configuration. The latching sleeves 162, 164 are configured to rotate in opposite directions. The specific rotational freedom of the latching sleeves 162, 164 may be constrained by the at least one pin 168, or it may include specific geometries. The lock biasing spring 166 biases the rotational position of the latching sleeves 162, 164 together to form the locked state of the locking system 160 as shown in FIGS. 1A, 2A, 2B. The specific rotational orientation and freedom of the latching sleeves 162, 164 includes allowing them to independently rotate apart. The latching sleeves 162, 164 are constrained to only rotate within a specific radial range, including but not limited to a substantially 35 degree rotation. As described above, the lock biasing spring 166 biases the latching sleeves 162, 164 toward one another, and therefore a user must apply a specific rotational force upon each of the latching sleeves 162, 164 may simultaneously transition the locking system 160 from the locked state to the unlocked state. FIG. 1B illustrates two rotational force arrows representing the two simultaneous forces which must be independently applied to the latching sleeves 162, 164 to overcome the lock biasing spring 166 and transition the locking system 160 from the locked state to the unlocked state. The unlocked state of the locking system shown in FIG. 1B includes exposing the recess 170 of the locking system 160. The recess 170 may be formed as part of the latching sleeve geometry. The positioning of the locking system 160 is configured such that the recess 170 is disposed over the gate frame coupling region 124 and the gate recess 146 in the unlocked state. The size and shape of the recess 170 corresponds to both the gate frame coupling region 124 and the gate recess 146 to allow the second end of the gate 144 to pivot within the enclosed region 102 in the open state. However, as soon as the independent rotational forces (FIG. 1B) are removed from the latching sleeves 162, 164 as the pivoting force (FIG. 1C) is applied on the gate 140, the latching sleeves 162, 164 will automatically rotate together as shown in FIG. 1C. Although the, latching sleeves 162, 164 are rotated together, the system 100 is not locked because the gate 140 is free to rotate. When the pivoting force (1C) is removed from the gate 140, the gate biasing spring will cause the gate 140 to pivot back to the closed state. The locking system 160 includes a notch 172 formed in part by both of the latching sleeves 162, 164. The notch 172 geometrically corresponds to the gate frame coupling region 124 and ramped surface 125 of the frame 120 to automatically rotate the latching sleeves 162, 164 apart as the gate 140 pivots from the open state (FIG. 1C) to the closed state (FIG. 1A). In particular, the ramped surface 125 acts as a wedge in the notch 172 to separate the latching sleeves 162, 164 and the gate 140 to pivot back to the closed state. This process may be referred to as the automatic re-locking of the gate 140, as all forces are released and the gate 140 is in the open state. When all forces are released and the gate 140 is in the open state, the gate biasing spring will urge the gate toward the closed state, and the ramped surface 125 wedges apart the latching sleeves 162, 164 to unlock the locking system 160 and automatically return the system 100 to the closed and locked state.

Reference is next made to FIGS. 2A-B, which illustrate a perspective system view and a detailed locking system view of the system 100 illustrated in FIG. 1B. FIG. 2A illustrates the system 100 with the gate 140 in the closed state and the locking system 160 in the unlocked state 160. As described above, the unlocked state 160 of the locking system 160 requires that a user apply rotational forces shown in FIG. 1B to separate the latching sleeves 162, 164 and expose the recess 170. FIG. 2B illustrates the locking system 160 in the unlocked state with the recess 170 exposed. FIG. 2B illustrates one embodiment of the latching sleeves 162, 164 geometry, including the substantially internested rotational coupling and pin 168 for restricting rotational freedom. It will be appreciated that various geometries of the latching sleeves 162, 164 are included to facilitate the rotational intercoupling, the recess 170, and notch 172. The latching sleeves 162, 164 may optionally include additional external flanges to enhance friction for better user grip. The recess 170 is specifically shaped to correspond with the gate recess 146 and gate frame coupling region 124. The notch 172 is a substantially concave shape formed in part by both latching sleeves 162, 164. In the illustrated unlocked state, the two portions of the notch 172 are separated. The illustrated lock biasing spring 166 is a torsion spring disposed at the bottom of the latching sleeves 162, 164 to bias the latching sleeves 162, 164 together to form the locked state.

Figure 3B:
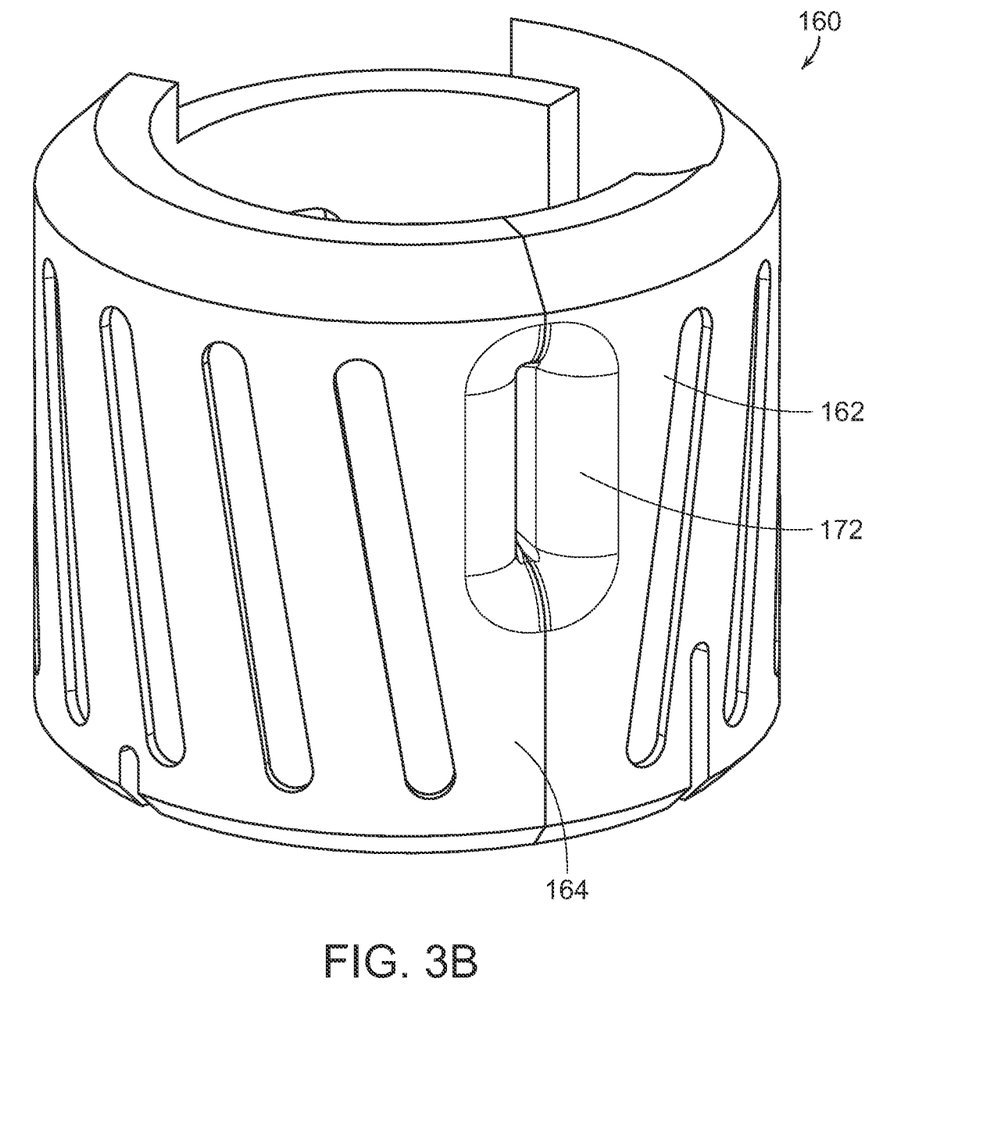

Reference is next made to FIGS. 3A-B, which illustrate a perspective system view and a detailed locking system view of the system illustrated in FIG. 1C. FIG. 3A illustrates the system 100 with the gate 140 in the open state and the latching sleeves 162, 164 rotated together. As described above, the open state of the gate 140 requires a user to selectively unlock the locking system 160 via rotational forces (FIG. 1B) and pivot the gate 140 via a pivot force (FIG. 1C). FIG. 3B illustrates the latching sleeves 162, 164 rotated together but the overall system is in the open state. The locked state of the system 100 only includes the latching sleeves 162, 164 rotated together and the gate 140 in the closed state (FIG. 1A). The latching sleeves 162, 164 are releasably forced together by the lock biasing spring 166. The recess 170 is therefore blocked, and the notch 172 is completely formed. As described above, the notch 172 requires the latching sleeves 162, 164 to be rotated together so as to couple the portions of the notch 172. The particular geometry and internal curvatures of the notch 172 correspond to the ramped surface 125 and the gate frame coupling region 124 of the frame 120. It will be appreciated that various alternative geometries of the notch 172 and ramped surface 125 have been contemplated as alternative embodiments. In particular, the correspondence between the notch 172 and the ramped surface 125 affect the operation, efficiency, and reliability of the automatic relocking of the locking system 160 when all forces are removed in the open state and the gate 140 is allowed the return to the closed state.

Figure 4:
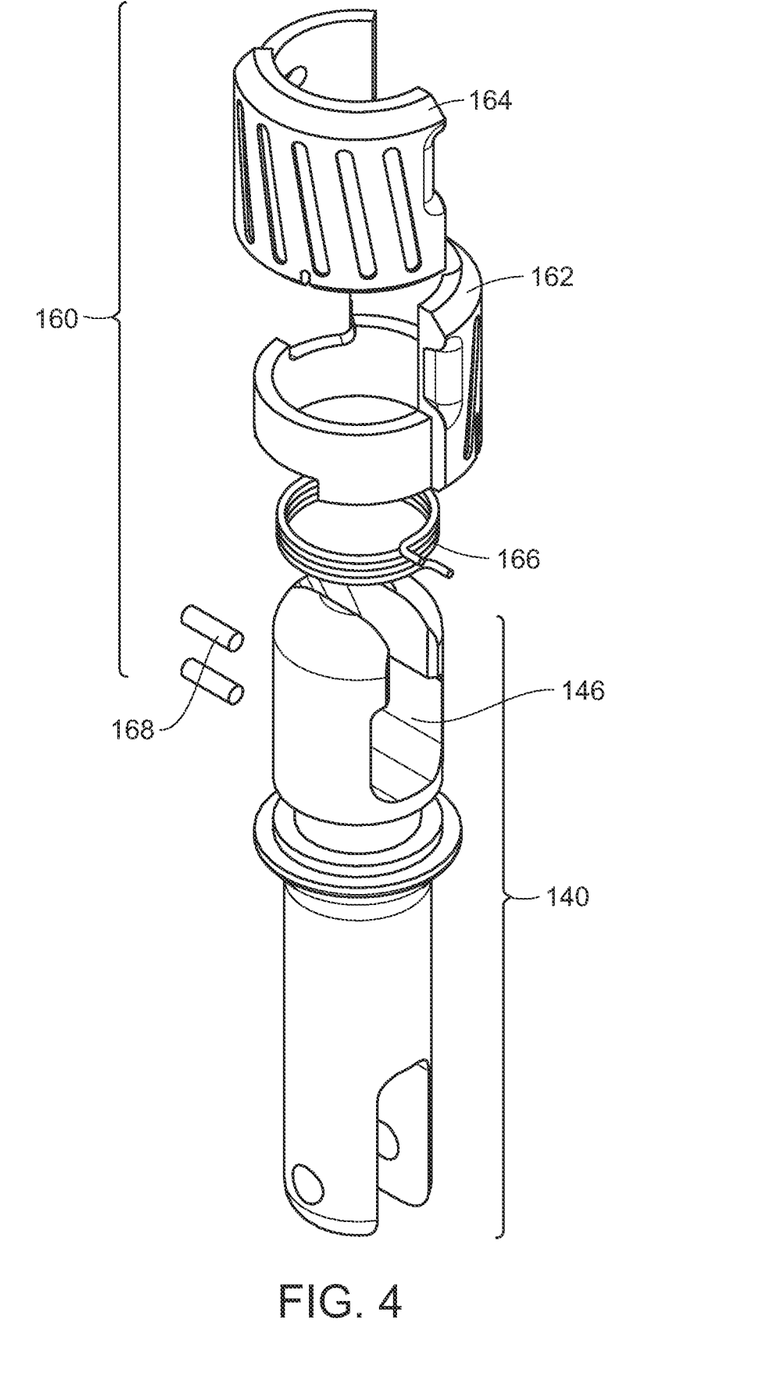
FIG. 4 illustrates an exploded view of the gate and locking system components of FIGS. 1-3 in accordance with one embodiment of the present invention.

Reference is next made to FIG. 4, which illustrates an exploded view of the gate and locking system components of the embodiments illustrated in FIGS. 1-3. The exploded view illustrates one embodiment of the components of the gate 140 and locking system 160 to enable the automatic locking functionality described above. The substantially cylindrical shape of the latching sleeves 162, 164 is illustrated. It will also be apparent that the shape of each of the latching sleeves 162, 164 is configured to correspond to each other to facilitate the internested and rotational coupling. The positioning of the lock biasing spring 166 will also be appreciated to facilitate the biasing of the latching sleeves 162, 164 radially together to engage the locked state. The positioning of the locking system 160 in substantial proximity to the second end 144 of the gate 140 and over the gate recess 146 should also be appreciated from the exploded view. The pins 168 may optionally constrain the rotational freedom of the latching sleeves 162, 164 in some form of internal channel between the latching sleeves 162, 164.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:
1. An automatic locking carabiner comprising:
   a frame including a gate frame coupling region, a pivot location, and an opening between the gate frame coupling region and the pivot location;
   a gate having a first end pivotably coupled about a pivot location to the frame, wherein the gate includes a second end;

a closed state in which the gate and frame form an enclosed region, wherein the second end of the gate is releasably coupled to the frame at the gate frame coupling region;

an open state in which the second end of the gate is pivotably rotated within the enclosed region;

a gate biasing system configured to bias the gate toward the closed state;

a gate locking system disposed on the gate in substantial proximity to the second end of the gate including:

a set of latching sleeves rotatably coupled to the gate, wherein the latching sleeves are configured to rotate a locked state in which the gate is in the closed state and the gate is prevented from pivoting with respect to the frame, wherein the locked state further includes orienting the rotational positioning of at least one of the latching sleeves over the gate frame coupling region of the frame;

an unlocked state in which the gate is in the closed state and the gate is free to pivot with respect to the frame, wherein the unlocked state further includes orienting the rotational positioning of latching sleeves to create a recess through which the gate frame coupling region of the gate may translate; and a lock biasing system biasing the gate locking system toward the locked state.

2. The system of claim 1 wherein the locked state further includes orienting the rotational positioning of at least one of the latching sleeves over the gate frame coupling region of the frame.

3. The system of claim 1, wherein the gate frame coupling region is notchless and hookless.

4. The system of claim 1, wherein the second end of the gate includes a coupling region geometrically corresponding to the gate frame coupling region of the frame.

5. The system of claim 1, wherein the second end of the gate includes a gate recess geometrically corresponding to the frame coupling region of the frame.

6. The system of claim 1, wherein the gate locking system is disposed circumferentially over the gate.

7. The system of claim 1, wherein latching sleeves are substantially cylindrically shaped and overlapping.

8. The system of claim 1, wherein the latching sleeves are internested and intercoupled with one another.

9. The system of claim 1, wherein the latching sleeves are configured to independently rotate in opposite directions away from one another from the locked state.

10. The system of claim 1, wherein the second end of the gate includes a gate recess and the latching sleeves are configured to create a recess over the gate recess in the unlocked state.

11. The system of claim 1, wherein the lock biasing system includes a torsion spring configured to rotationally bias the latching sleeves to the locked state.

12. The system of claim 1, wherein the latching sleeves are internested and intercoupled with at least one pin configured to constrain the inter-rotational freedom between the latching sleeves.

13. The system of claim 1, wherein the gate frame coupling region includes a ramped surface configured to temporarily unlock the locking system when the gate is released in the open state and returned to the closed state via the gate biasing system.

14. An automatic locking carabiner comprising:

a frame including a gate frame coupling region, a pivot location, and an opening between the gate frame coupling region and the pivot location;

a gate having a first end pivotably coupled about a pivot location to the frame, wherein the gate includes a second end;

a closed state in which the gate and frame form an enclosed region, wherein the second end of the gate is releasably coupled to the frame at the gate frame coupling region;

an open state in which the second end of the gate is pivotably rotated within the enclosed region;

a gate biasing system configured to bias the gate toward the closed state;

a gate locking system circumferentially disposed over the gate in substantial proximity to the second end of the gate including:

a set of latching sleeves rotatably coupled to the gate, wherein the latching sleeves are overlapping and configured to rotate opposite from one another;

a locked state in which the gate is in the closed state and the gate is prevented from pivoting with respect to the frame, wherein the locked state further includes orienting the rotational positioning of the latching sleeves over the gate frame coupling region of the frame;

an unlocked state in which the gate is in the closed state and the gate is free to pivot with respect to the frame, wherein the unlocked state further includes orienting the rotational positioning of latching sleeves to create a recess through which the gate frame coupling region of the gate may translate, wherein the second end of the gate includes a gate recess and the latching sleeves are configured to create a recess over the gate recess in the unlocked state; and a lock biasing system biasing the gate locking system toward the locked state.

15. A method for automatically locking a carabiner comprising the acts of:

providing a frame including a gate frame coupling region, a pivot location, and an opening between the gate frame coupling region and the pivot location;

providing a gate having a first end pivotably coupled about a pivot location to the frame, wherein the gate includes a second end;

providing a closed state in which the gate and frame form an enclosed region, wherein the second end of the gate is releasably coupled to the frame at the gate frame coupling region;

providing an open state in which the second end of the gate is pivotably rotated within the enclosed region;

providing a gate biasing system configured to bias the gate toward the closed state;

providing a gate locking system disposed on the gate in substantial proximity to the second end of the gate including:

a set of latching sleeves rotatably coupled to the gate, wherein the latching sleeves are configured to rotate;

automatically engaging a locked state in which the gate is in the closed state and the gate is prevented from pivoting with respect to the frame, wherein the locked state further includes orienting the rotational positioning of the latching sleeves over the gate frame coupling region of the frame;

wherein the automatic engagement of the locked state includes rotationally biasing the latching sleeves together;

selectively engaging an unlocked state in which the gate is free to pivot with respect to the frame, wherein the unlocked state further includes orienting the rotational positioning of latching sleeves to create a recess through which the gate frame coupling region of the gate may translate.

16. The method of claim 15, wherein the act of selectively engaging an unlocked state in which the gate is free to pivot with respect to the frame includes independently rotating the latching sleeves to expose a recess over a gate recess on the second end of the gate.

17. The method of claim 16, wherein the act of selectively engaging an unlocked state includes independently rotating the latching sleeves away from one another.

18. The method of claim 15, wherein the automatic engagement of the locked state includes rotationally biasing the latching sleeves toward one another.

19. The method of claim 15, wherein the second end of the gate includes a coupling region geometrically corresponding to the gate frame coupling region of the frame.

20. The method of claim 15, wherein the gate locking system is disposed circumferentially over the gate.

* * * * *